United States Patent Office 2,712,012
Patented June 28, 1955

2,712,012

3-SULFANILAMIDO-6-SUBSTITUTED PYRIDAZINES AND METHOD OF PREPARING THE SAME

Joe H. Clark, Darien, Conn., assignor to American Cyanamid Company, New York, N. Y., a corporation of Maine No Drawing. Application November 10, 1954,
Serial No. 468,144

10 Claims. (Cl. 260—239.7)

This invention relates to sulfanilamidopyridazines. More particularly, it relates to 3-sulfanilamido-6-substituted pyridazines and methods of preparing the same.

In United States Patent No. 2,371,115, issued March 6, 1945, a number of para-substituted benzene sulfonamidopyridazines are described which have chemotherapeutic activity and are valuable intermediates for the production of azo dyes of extraordinary light fastness. In copending application, Serial Number 400,376, filed December 24, 1953, an improved process for the production of sulfanilamidopyridazines using 3,6-dichloropyridazine and sulfanilamide is described.

We have found that the sulfanilamido-6-chloropyridazine prepared by the improved process of application, Serial Number 400,376 is useful as an intermediate in preparing the therapeutically useful 6-substituted sulfanilamidopyridazines. These new compounds of the present invention may be illustrated by the following general formula:

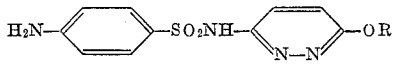

in which R is an alkyl, aralkyl or aryl radical. The alkyl radicals may be, for example, methyl, ethyl, propyl, butyl, amyl, etc. The aralkyl radicals may be benzyl, phenethyl, phenpropyl, phenbutyl and the like. The aryl radicals may be phenyl, naphthyl, etc.

The compounds of the present invention are, in general, crystalline solids having a melting point above 100° C. They can be recrystallized from water or alcohols or a mixture of water and alcohol.

These compounds can be prepared by using 3-sulfanilamido-6-chloropyridazine as an intermediate which is reacted with, for example, simple alcohols, phenol, benzyl alcohol, phenethyl alcohol, and the like. It is usually desirable to heat the reaction mixture to a temperature within the range of 50° C. to 250° C. for a period of from ten minutes to fifteen hours. An alkali metal such as sodium or potassium is added to the alcohol to form the corresponding alcoholate which is then reacted with the 3-sulfanilamido-6-chloropyridazine.

The compounds of the present invention, when given orally, show greater survival in mice against pneumococcus Strain SVI than related compounds. The following Table I shows the detailed results obtained when using sulfadiazine, sulfapyridazine and 3-sulfanilamido-6-methoxypyridazine.

TABLE I

*Pneumococcus strain SVI*

SULFADIAZINE

| Percent Drug in Diet | Drug Intake,[a] mg./kg./day | Blood Level, mg. percent | Mice, Alive/Total | Percent Effect |
|---|---|---|---|---|
| 0.4 | 850 | 14.5 | 40/40 | 100.0 |
| 0.2 | 399 | 8.6 | 20/40 | 50.0 |
| 0.1 | 160 | 4.8 | 10/40 | 25.0 |
| 0.05 | 49 | 2.2 | 2/39 | 5.0 |
| 0.025 | 18 | 1.1 | 0/40 | 0.0 |

(Median effective dose=290 (220–380) mg./kg./day

SULFAPYRIDAZINE

| 0.8 | 1,800 | 6.6 | 39/39 | 100.0 |
| 0.4 | 660 | 2.8 | 10/40 | 25.0 |
| 0.2 | 270 | 1.3 | 8/40 | 20.0 |
| 0.1 | 76 | | 1/40 | 2.5 |
| 0.05 | 43 | | 0/40 | 0.0 |

(Median effective dose=880 (310–2500) mg./kg./day

3-SULFANILAMIDO-6-METHOXYPYRIDAZINE

| 0.4 | 940 | 19.0 | 40/40 | 100.0 |
| 0.2 | 450 | 11.0 | 36/40 | 90.0 |
| 0.1 | 180 | 6.0 | 10/39 | 25.6 |
| 0.05 | 65 | 3.0 | 8/40 | 20.0 |
| 0.025 | 19 | 1.3 | 1/40 | 2.5 |

(Median effective dose=180 (140–220) mg./kg./day

[a] Drug intake values are averages based on four tests of each drug diet.

Figures in parentheses indicate 95% confidence limits for each median.

When the present compounds are fed to mice infected with several different bacteria along with related compounds they show a greater activity. This is illustrated in Table II below.

TABLE 2

*Relative antibacterial activities*

RELATIVE ACTIVITY BASED ON ORAL DOSAGE [a]

| Drug | Pneumococcus Strain SVI | Streptococcus Strain C-203 | Klebsiella Strain AD | Pasteurella Strain 310 |
|---|---|---|---|---|
| Sulfadiazine (Standard) | 1.0 | 1.0 | 1.0 | 1.0 |
| Sulfapyridazine | 0.3 | 0.5 | 0.1 | 0.3 |
| Sulfamethoxypyridazine | 1.6 | 0.9 | 0.5 | 0.9 |
| Gantrisin | 0.3 | 0.2 | 0.1 | 0.1 |

[a] Relative activity based on dosage=ED$_{50}$ of sulfadiazine/ED$_{50}$ of other drug.

The preparation of the therapeutically useful compounds of the present invention is described in greater detail in the following examples. All parts are by weight unless otherwise indicated.

EXAMPLE 1

*3-sulfanilamido-6-methoxypyridazine*

2.3 parts of clean sodium metal is dissolved in 50 parts of anhydrous methyl alcohol. 11.4 parts of 3-sulfanilamido-6-chloropyridazine is added and the mixture heated in a sealed tube 13 hours at 130°–140° C. After the tube has cooled it is opened and the reaction mixture filtered, acidified with dilute acetic acid, then evaporated to dryness on the steam bath. The residue is dissolved in 80 parts of 5% sodium hydroxide, chilled and acidified with dilute acetic acid. The crude product is filtered and then recrystallized from water to give 3-sulfanilamido-6-methoxypyridazine of melting point 182°–183° C.

EXAMPLE 2

*3-sulfanilamido-6-ethoxypyridazine*

0.6 part of clean sodium metal is dissolved in 75 parts of absolute ethyl alcohol. 2.9 parts of 3-sulfanilamido-6-chloropyridazine is added and the mixture heated in a sealed tube 13 hours at 145°–155° C. After the tube has cooled it is opened and the reaction mixture filtered, acidified with dilute acetic acid, then evaporated to dryness on the steam bath. The residue is dissolved in 20 parts of 10% sodium hydroxide, chilled and acidified with dilute acetic acid. The crude product is filtered and then recrystallized from water-ethanol to give 3-sulfanilamido-6-ethoxypyridazine, melting point 183°–184° C.

EXAMPLE 3

3-sulfanilamido-6-n-propoxypyridazine 0.6 part of clean sodium metal is dissolved in 75 parts of n-propyl alcohol. 2.9 parts of 3-sulfanilamido-6-chloropyridazine is added and the mixture heated in a sealed tube 13 hours at 145°–155° C. After the tube has cooled it is opened and the reaction mixture filtered, acidified with dilute acetic acid, then evaporated to dryness on the steam bath. The residue is dissolved in 10 parts of 5% sodium hydroxide, chilled and acidified with dilute acetic acid. The crude product is filtered and recrystallized from water-ethanol to give 3-sulfanilamido-6-n-propoxypyridazine, melting point 184°–185° C.

EXAMPLE 4

3-sulfanilamido-6-i-propoxypyridazine 0.6 part of clean sodium metal is dissolved in 75 parts of i-propyl alcohol. 2.9 parts of 3-sulfanilamido-6-chloropyridazine is added and the mixture heated in a sealed tube 13 hours at 145°–155° C. After the tube has cooled it is opened and the reaction mixture filtered, acidified with dilute acetic acid, then evaporated to dryness on the steam bath. The residue is dissolved in 10 ml. of 5% sodium hydroxide, chilled and acidified with dilute acetic acid. The crude product is filtered and recrystallized from water-ethanol to give 3-sulfanilamido-6-i-propoxypyridazine, melting point 187°–188° C.

EXAMPLE 5

3-sulfanilamido-6-n-hexoxypyridazine 0.6 part of clean sodium metal is dissolved in 200 parts of n-hexyl alcohol. 2.9 parts of 3-sulfanilamido-6-chloropyridazine is added and the mixture refluxed 40 hours at 157° C. The excess alcohol is then vacuum distilled. The residue is suspended in ether, filtered, washed two times with ether, then dissolved in 20 parts of water and acidified with dilute acetic acid. The crude product is filtered out, then recrystallized from water-ethanol to give 3 - sulfanilamido - 6 - n - hexoxypyridazine, melting point 140°–141° C.

EXAMPLE 6

3-sulfanilamido-6-phenoxypyridazine 0.6 part of clean sodium metal is dissolved in 50 parts of methyl alcohol. 2.9 parts of 3-sulfanilamido-6-chloropyridazine and 60 parts of phenol is added and this solution heated to 140° C. to drive off all traces of methyl alcohol and water. The residue is heated at 140° C. for 9 hours, then the excess phenol is distilled off. The residue is suspended in ether, filtered, washed two times with ether, then dissolved in 20 parts of water and acidified with dilute acid. The crude product is filtered out, then recrystallized from water-ethanol to give 3-sulfanilamido-6-phenoxypyridazine. The compound melts at 139°–140° C., resolidifies and melts again at 160°–161° C.

EXAMPLE 7

3-sulfanilamido-6-benzyloxypyridazine 0.6 part of clean sodium metal is dissolved in 150 parts of benzyl alcohol. 2.9 parts of 3-sulfanilamido-6-chloropyridazine is added and the mixture heated 13 hours at 145°–147° C. The excess alcohol is then vacuum distilled. The residue is suspended in ether, filtered, washed two times with ether, then dissolved in 20 parts of water and acidified with dilute acetic acid. The crude product is filtered, then recrystallized from ethyl alcohol to give 3 - sulfanilamido - 6 - benzyloxypyridazine, melting point 200°–201° C.

EXAMPLE 8

3-sulfanilamido-6-phenethoxypyridazine 0.6 part of clean sodium metal is dissolved in 150 parts beta-phenethyl alcohol. 2.9 parts of 3-sulfanilamido-6-chloropyridazine is added and the mixture refluxed two and one-half hours at 220° C. The excess alcohol is then vacuum distilled. The residue is suspended in ether, washed two times with ether, dissolved in 20 parts of water and acidified with dilute acetic acid. The crude product is filtered, then recrystallized from absolute alcohol to give 3-sulfanilamido-6-phenethoxypyridazine of melting point 173°–174° C.

I claim:

1. Compounds of the group having the formula:

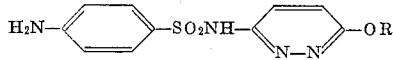

in which R is a member of the group consisting of lower alkyl, phenyl lower alkyl and phenyl radicals.

2. 3-sulfanilamido-6-lower alkoxypyridazines.
3. The compound 3-sulfanilamido-6-methoxypyridazine.
4. The compound 3-sulfanilamido-6-ethoxypyridazine.
5. The compound 3-sulfanilamido-6-i-propoxypyridazine.
6. The compound 3-sulfanilamido-6-phenoxypyridazine.
7. The compound 3-sulfanilamido-6-benzyloxypyridazine.
8. A method of preparing compounds having the general formula:

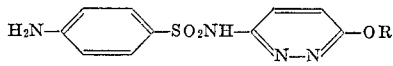

in which R is a member of the group consisting of lower alkyl, phenyl lower alkyl and phenyl radicals which comprises heating 3-sulfanilamido-6-chloropyridazine with the reaction product of an alkali metal with an alcohol having the formula:

ROH in which R is as defined above.

9. A method of preparing a 3-sulfanilamido-6-lower alkoxypyridazine which comprises heating 3-sulfanilamido-6-chloropyridazine with the reaction product of an alkali metal with a lower alkyl alcohol.

10. A method of preparing 3-sulfanilamido-6-methoxypyridazine which comprises heating 3-sulfanilamido-6-chloropyridazine with an alkali metal methylate.

References Cited in the file of this patent

UNITED STATES PATENTS 2,371,115    Winnek et al. _____ Mar. 6, 1945